(12) United States Patent
Jiang et al.

(10) Patent No.: US 8,495,644 B2
(45) Date of Patent: Jul. 23, 2013

(54) METHOD FOR REGISTERING AND SCHEDULING EXECUTION DEMANDS

(75) Inventors: Shyh-Biau Jiang, Taoyuan (TW); Hisao-Yi Yen, Taoyuan (TW)

(73) Assignee: National Central University, Jung-li, Taoyuan (TW)

( * ) Notice: Subject to any disclaimer, the term of this patent is extended or adjusted under 35 U.S.C. 154(b) by 344 days.

(21) Appl. No.: 13/080,166

(22) Filed: Apr. 5, 2011

(65) Prior Publication Data

US 2012/0060164 A1    Mar. 8, 2012

(30) Foreign Application Priority Data

Sep. 2, 2010  (TW) ................................ 99129569 A

(51) Int. Cl.
*G06F 9/46* (2006.01)
(52) U.S. Cl.
USPC .......................................... 718/103; 718/102
(58) Field of Classification Search
None
See application file for complete search history.

(56) References Cited

U.S. PATENT DOCUMENTS 5,353,422 A * 10/1994 Kobayashi et al. ........... 711/170
2004/0064570 A1 * 4/2004 Tock ............................. 709/228

* cited by examiner

*Primary Examiner* — Kenneth Tang
(74) *Attorney, Agent, or Firm* — Muncy, Geissler, Olds & Lowe, PLLC

(57) ABSTRACT

A method for registering and scheduling execution demands comprises steps of: providing an execution demand register having a plurality of execution demand registering flags describing whether an identical number of jobs are registered execution demands or not and priorities thereof; providing a lookup device, and using all possible values of the execution demand registering flags as addresses to respectively store thereinside a job sequence permutation, initial position and registering number corresponding to the job sequence permutation; when a job has to be executed successively, setting the value of the execution demand registering flag corresponding to the job; and in scheduling, using the value of the execution demand registering flag of the updated execution demand register as a lookup address to acquire the initial position and registering number from the lookup device, and finding out the job sequence permutation according to the acquired initial position and registering number to complete scheduling.

6 Claims, 2 Drawing Sheets

METHOD FOR REGISTERING AND SCHEDULING EXECUTION DEMANDS

FIELD OF THE INVENTION

The present invention relates to a method for registering and scheduling execution demands to assist a computer system in arranging real-time and multitasking demand programs, particularly to a method for registering and scheduling execution demands, which uses the contents of the execution demand register as addresses to search for the indexes of the jobs that are newly registered with execution demand in the memories according to an address table and stores the indexes into an execution-standby queue to complete scheduling according to the priority of the jobs that are newly registered with execution demand; while executing the jobs, selecting the execution-standby job whose index has the highest priority in the execution-standby queue after each scheduling, whereby is achieved the real-time and multitasking requirement.

BACKGROUND OF THE INVENTION

The computer (microprocessor) is an invention that greatly influences daily living of human beings. Many products, even as tiny as the core of a digital watch, are configured with one or more microprocessors, or configured with a microcontroller containing a microprocessor. At present, the mainstream large computer has 64-bit microcontroller and mainstream small computer has 8-bit microcontroller.

Both large computers and small computers operate according to programs written by programmers. Theoretically, a microprocessor can only process one program in one moment. However, a computer can seemingly process several programs simultaneously in the same period via the interruption mechanism provided by the hardware and the time-sharing mechanism provided by the operating system, or via a plurality of sub-task blocks divided by the programmer and executed segmentedly. Such a technology is so-called "multitasking".

In a multitasking computer system, many tasks simultaneously share the operation resources of the computer. If the operation resource sharing is not appropriately controlled, a certain task cannot be finished within a period of validity or never finished; for example, the second hand of the digital watch cannot be updated each second. The requirement for finishing a task within a period of time is called "real-time task".

In order to process many tasks simultaneously with a single microprocessor, all the programs executed simultaneously in a computer have to be divided into a plurality of sub-task blocks, and each sub-task block should not occupy too long an execution time lest other programs sharing the resources of the computer cannot be executed timely. After a program has been divided into many sub-task blocks, the sub-task blocks must be controlled to be executed sequentially one after one, and the sub-task blocks of other programs are allowed to be interposed and executed during transition of the sub-task blocks in the same program.

Therefore, a multitasking mechanism at least comprises four mechanisms of division, register, scheduling and execution. Each program can be divided into many sub-task blocks. Each sub-task block will register an execution demand for the succeeding sub-task block. The scheduling mechanism arranges the execution sequence for the registered execution demands. Finally, the sub-task blocks are executed according to the execution sequence.

Traditionally, the aforesaid four mechanisms are divided by the programmer according to the execution stages of the program. After divided, the succeeding program block is established an enable flag before the preceding program block is finished to complete register of an execution demand. The scheduling is implemented by a polling mechanism, which alternately searches the execution-demand flags of all the sub-task blocks possibly needing execution. The first sub-task block having execution demand in polling will be executed firstly.

The abovementioned approach that the programmer processes by himself has three primary problems: 1. an optimized division only can be achieved by requiring a sophisticated programmer; 2. the greater number of the sub-task blocks, the more execution time consumed in polling; 3. the scheduling is random, such that the execution timing is unstable.

The current operating system aims to solve the first problem with the second problem being improved by the way. The current operating system is derived from the concept of time-sharing and multitasking, where a core program of the operating system is added to control operation of other programs in addition to the application program. The core program of the operating system is triggered and executed by timing interruption. The work of the core program includes dividing and examining the currently executed task, registering the programs having execution demands, determining whether to interrupt the task that is being executed according to the predetermined priority sequence, and determining which task will be executed next, which belong to the scheduling mechanism thereof. When switching tasks being needed, the interrupted task is registered in the execution-standby queue and arranges to execute new tasks while leaving the core program. Thereby, the operating system takes charge of the four mechanisms required by a multitasking system—division, register, scheduling and execution, and exempts programmers from the burden of handling the four mechanisms by himself. As the division mechanism handled by the operating system, the sections that have been executed are eliminated automatically while the sections that have not been executed needn't to perform polling. Therefore, the tasks needed to be polled are limited by the number of the programs which are executed simultaneously without greatly increasing caused by division of program. Thus is improved the abovementioned second problem of more polling burden. However, the problem of randomly selecting the registered tasks still exists if scheduling of the operating system is undertaken in a polling way.

Using an operating system indeed solves some problems, but the system also pays some cost for it. Firstly, as the operating system itself is also a program and occupies some operation resources while executing, the system has to pay extra cost in operation time. As the operating system divides a program by timing, it cannot predict which part of the program is to be divided. In order to protect the data in the preceding section and the succeeding section does not be changed, the operating system has to temporarily store all the variables in the program that have been interrupted being transferred from a flash memory to a slower memory, and transfers the preceding stored variables in the program that will be executed from the slower memory to the flash memory. Such an action is called "context switch". Context switch not only consumes extra operation time but also occupies much extra memory space. This problem is generated accompanying the action that the operating system divides a program by timing.

An ordinary operating system does not concern the real time. However, in some industrial applications, such as automatic control and instrumental measurement, real-time performance is highly demanded. The real-time demand will not be satisfied unless the random execution caused by polling is overcome. A real time operating system (RTOS) has been developed to solve the real-time problem for industrial computers. In a time-sharing and multitasking operating system, if the frequency of core execution and division in the operating system can be increased to the period of real-time task, it can provide new register and execution opportunity for a task having real-time demand. Besides, the problem of random execution caused by polling of the execution-standby tasks has to be overcome or reduced. Thus, the priorities can be separated for different execution-standby tasks to reduce and limit the number of the tasks to be polled. Thereby, the uncertainty of polling and random selection of the execution-standby tasks can be decreased, and the real-time demand is more likely to be satisfied.

Increasing the frequency of the scheduling and core execution in the operating system indeed creates the possibility that the real time is scheduled into the period, but extra execution time occupied by core execution in the operating system and extra execution time of transferring data between different memories in context switch also are doubled.

If the operation capability of the computer system is not so high, the operating system will occupy much more execution time than other application programs, especially in a real-time operating system. Therefore, a great majority of operating system is used in a larger computer (at least a PC rank computer). An 8-bit or 16-bit microcontroller/digital signal processor (DSP) seldom adopts a multitasking operating system to execute scheduling. Even if the computer adopts the multitasking operating system, it usually is used to reduce the ratio that the operating system occupying the extra execution time by removing the context switch mechanism but adopting a wide-area fixed memory instead.

No matter whether scheduling is performed by the programmer himself or by the scheduler of the operating system, the problem of random selection always appears as long as scheduling is implemented via polling and searching the flags of registered execution demands. In these cases, the uncertainty of real-time performance increases.

According to the above conventional technologies, a simple and fast scheduler, which has fixed scheduling to occupy extra execution time, is absent to provide a stable and real-time scheduling function.

SUMMARY OF THE INVENTION

One objective of the present invention is to provide a two-stage table lookup method for registering and scheduling execution demands to replace the conventional polling procedure, which is implemented simply and fast and provides stable execution time.

Another objective of the present invention is to provide a method for registering and scheduling execution demands including a mechanism, in which the preceding task block registers an execution demand for the succeeding task block after task block division, to be cooperated with the two-stage table lookup method for registering and scheduling execution demands to reduce the scheduling time.

The present invention can assist in the task block division no matter whether the division is performed by a programmer himself or a time-sharing/multitasking operating system, wherein the preceding task block registers an execution demand for the succeeding task block and performs scheduling according to the registered execution demand, whereby is improved scheduling execution efficiency and decreased scheduling time uncertainty, and is provided higher real-time performance.

The present invention proposes a method for registering and scheduling execution demands, which comprises steps of: providing an execution demand register having a plurality of execution demand registering flags correspondingly describing the registered execution demands of an identical number of jobs and the sequence for executing priorities of the jobs; providing a lookup device, wherein using all possible values of the execution demand registering flags as addresses to store job sequence permutations, and the initial positions and registering number corresponding to the job sequence permutations in the lookup device; when a job has to be executed successively, setting the value of the execution demand registering flag corresponding to the job; and when during scheduling, using the values of the execution demand registering flags of the updated execution demand registers as the lookup addresses, and acquiring the initial addresses and the registering number from the lookup device, and then finding out the job sequence permutations according to the acquired initial addresses and registering number to complete scheduling.

BRIEF DESCRIPTION OF THE DRAWINGS

The embodiments are described with the following drawings to make easily understood the objectives, characteristics and advantages of the present invention.

DETAILED DESCRIPTION OF THE PREFERRED EMBODIMENTS

Below, the technical contents of the present invention will be described in detail with the embodiments. However, the embodiments are only to exemplify the present invention but not to limit the scope of the present invention. It should be understood that any one skilled in the art should be able to vary or modify the embodiments easily without departing from the spirit of the present invention. Therefore, any equivalent modification or variation according to the spirit of the present invention is to be also included within the scope of the present invention.

Figure 1:
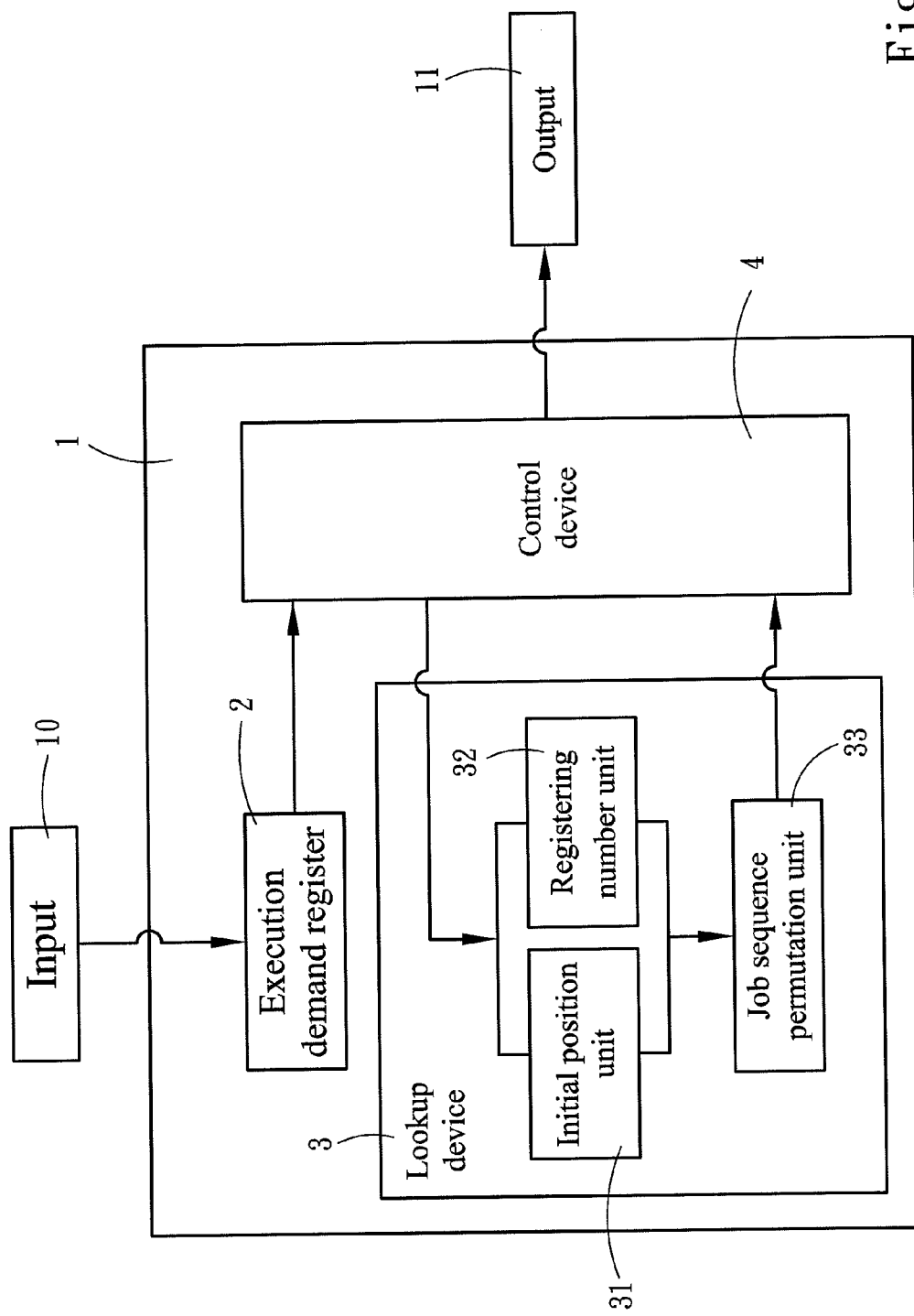
FIG. 1 is a block diagram schematically showing a scheduler according to one embodiment of the present invention.
Figure 2:
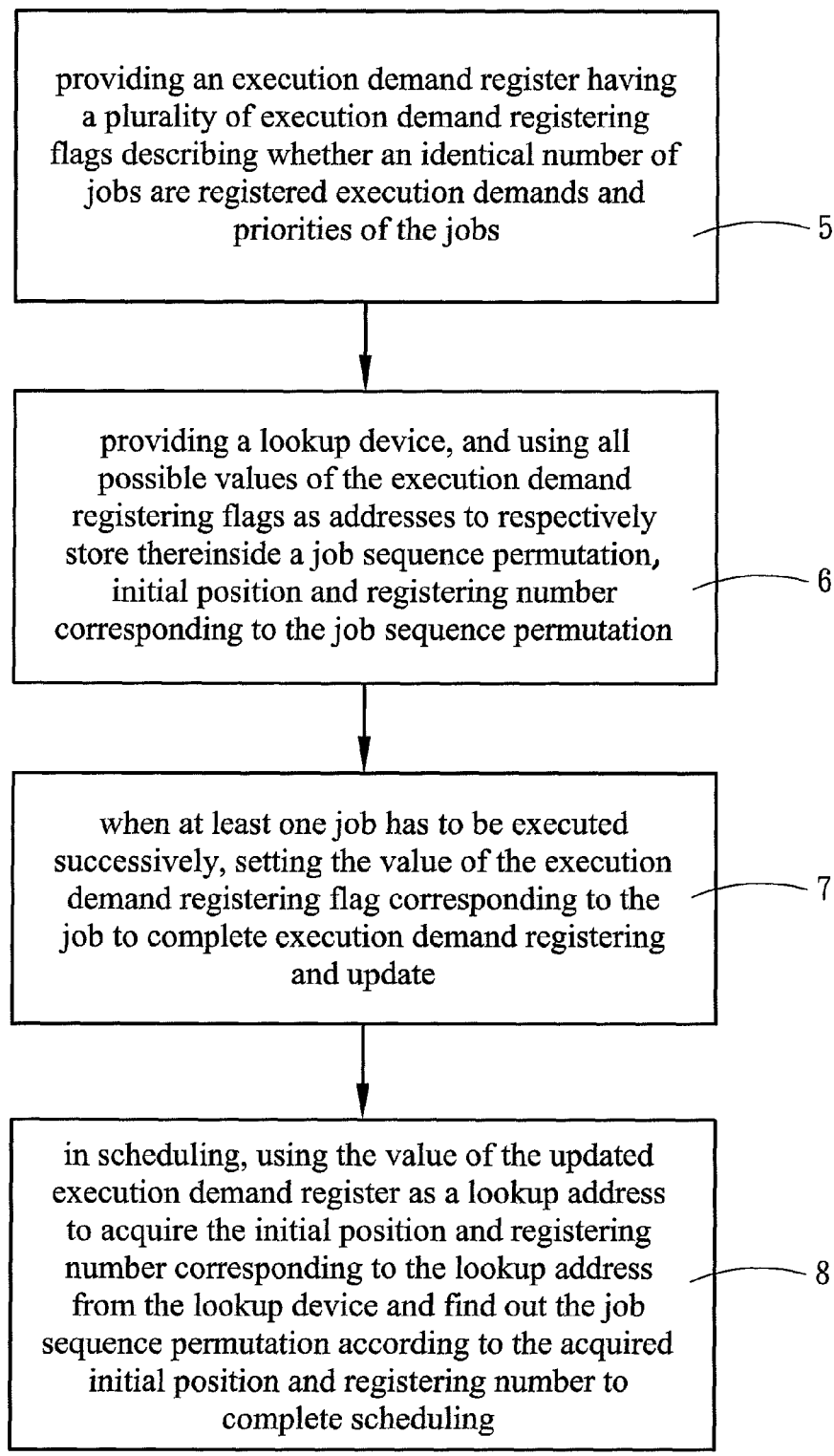
FIG. 2 is a flowchart of a scheduling method according to one embodiment of the present invention.

Refer to FIG. 1 and FIG. 2 respectively a block diagram schematically showing a scheduler according to one embodiment of the present invention and a flowchart of a scheduling method according to one embodiment of the present invention. As shown in FIG. 1, the present invention proposes a scheduler 1, which comprises an execution demand register 2, a lookup device 3 and a control device 4.

As shown in Step 5 of FIG. 2, the execution demand register 2 has a plurality of execution demand registering flags describing whether an identical number of jobs are registered execution demands or not and the priorities thereof. The execution demand registering flags may be realized with a plurality of bits, and a corresponding bit represents whether a job is executed or not. For example, a corresponding bit having a value of 1 represents job execution, and the position of the bit represents the priority execution of the job. Below are described the contents of the execution demand register 2 or the contents of the execution demand registering flags. In fact, the execution demand register 2 and the execution demand registering flags are synonymous and can be used alternately in the specification.

Refer to Table.1. In one embodiment, the execution demand register 2 contains 4-bit execution demand registering flags corresponding to the execution sequences of four jobs. However, the present invention does not limit that the flag should have 4 bits.

As shown in Table.1, when a job is needed to be executed, a control device 4 sets the value of the execution demand registering flag corresponding to the job to be 1 (high) to complete the register of the execution demand. In one embodiment, the sequences of the bits of the execution demand registering flags represent the execution priority sequences of the corresponding jobs. For example, the job corresponding to the execution demand registering flag having the least significant bit (LSB) possesses the highest execution priority. Therefore, in the 4-bit execution demand register with b3b2b1b0, the job JOB0 corresponding to b0 has the highest execution priority, and the job JOB3 corresponding to b3 has the lowest execution priority. In other words, taking 1011 for an example, the job execution sequence is "JOB0→JOB1→JOB3".

According to the principle described above, Table.1 lists sixteen values corresponding to the execution demand register 2 containing 4-bit execution demand registering flags and the job execution sequences. As shown in Table.1, all the permutations and their values of the execution demand registering flags corresponding to 4 bits are listed.

TABLE 1 the execution demand register containing 4-bit execution demand registering flags and the job sequence permutation thereof

| Execution demand registering flag | Execution demand register value synthesized from execution demand registering flag | Job sequence permutation |
| --- | --- | --- |
| 0000 | 0 | unsuitable |
| 0001 | 1 | JOB0 |
| 0010 | 2 | JOB1 |
| 0011 | 3 | JOB0→JOB1 |
| 0100 | 4 | JOB2 |
| 0101 | 5 | JOB0→JOB2 |
| 0110 | 6 | JOB1→JOB2 |
| 0111 | 7 | JOB0→JOB1→JOB2 |
| 1000 | 8 | JOB3 |
| 1001 | 9 | JOB0→JOB3 |
| 1010 | 10 | JOB1→JOB3 |
| 1011 | 11 | JOB0→JOB1→JOB3 |
| 1100 | 12 | JOB2→JOB3 |
| 1101 | 13 | JOB0→JOB2→JOB3 |
| 1110 | 14 | JOB1→JOB2→JOB3 |
| 1111 | 15 | JOB0→JOB1→JOB2 →JOB3 |

Refer to FIG. 1 again. When determining whether there is a job which is newly registered and has execution demand and scheduling the job into the execution-standby queue according to the priority thereof, the control device 4 uses the values synthesized from the current execution demand registering flags stored in the execution demand register 2 as the lookup indexes, and then acquires all the jobs which are newly registered and have execution demands via searching in the two-stage lookup device 3. Then, the control device 4 arranges the jobs into the execution-standby queue according to the priorities thereof to complete the scheduling.

The lookup device 3 of the present invention has a plurality of memories storing the lookup information of the newly-registered jobs corresponding to the values of the execution demand register 2. The details thereof will be described later. In one embodiment, the lookup information includes an initial position and registering number. The initial position is the earliest position of the newly-registered job having the highest priority in the table of job sequence permutation. The registering number is the total number of the newly-registered jobs. In one embodiment, the lookup device 3 includes an initial position unit 31, a registering number unit 32 and a job sequence permutation unit 33. As shown in Step 6 of FIG. 2, the job sequence permutation unit 33 uses all possible values of the execution demand registering flags as the addresses to store the job sequence permutations according the priorities thereof. The initial position unit 31 and the registering number unit 32 use the execution demand registering flags as the addresses to respectively store the initial position of the newly-registered job having the highest priority in the job sequence permutations and the total number of the newly-registered jobs. In other words, the lookup device 3 is mapped to a 2-dimensional table whose two dimensions are respectively the initial positions of the jobs and the registering number. The fields of the table store the job sequence permutations. As shown in Table.1, the abovementioned job sequence permutations include all the possible groups of the jobs needed to be executed and the execution sequence thereof. In one embodiment, the job sequences stored in the job sequence permutation unit 33 have been compressed and optimized, and only the smallest possible job sequence permutation is stored.

In practice, the initial position unit 31, registering number unit 32 and job sequence permutation unit 33 may be data-storage memories, such as read only memories (ROMs). As shown in Step 7 of FIG. 2, when at least one job has to be executed successively, the value of the execution demand registering flag corresponding to the job is set, which is called "job flagging register". In order to execute many jobs simultaneously in the same period, each of the programs executed in the computer is divided into many small blocks, and the blocks are executed successively according to the priorities thereof. Such a process is called "relay" execution. In one embodiment, before a preceding task block is ended, the preceding task block establishes the execution demand registering flag for the succeeding task block, whereby the succeeding block is registered for execution.

As shown in Table.1, each execution demand register 2 can represent the newly-registered jobs and the priority sequences thereof. The present invention does not limit that there is only one newly-registered job r before proceeding scheduling. Next, as shown in Step 8 of FIG. 2, the present invention provides a two-stage lookup device 3. In the first stage, the value of the execution demand register 2 synthesized from the execution demand registering flag set by the interrupted or preceding block is used as the lookup address. According to the lookup address, the corresponding initial position and registering number are found out from the initial position unit 31 and the registering number unit 32. In the second stage, the values synthesized from the execution demand registering flags of the execution demand register 2 are used as the lookup addresses once again to find out the job sequence permutations of the newly-registered jobs arranged according to the priorities from the job sequence permutation unit 33. Then, the job sequence permutations are placed into the execution-standby queue to complete scheduling. Herein, an execution demand register 2, which has 4-bit execution demand registering flag 0x0B, is used for exemplification. Firstly, 0x0B is used as the lookup index to look up the initial position unit 31. The execution demand registering flag 0x0B of the execution demand register 2 is converted into a decimal value of "11".

According to the initial position unit 31 in Table.2, it is found that the 11$^{th}$ element of the initial position unit 31 is "7", which is underlined and expressed by "memory (11)=7", wherein 11 denotes the address of the memory and 7 is the lookup value. "Lookup value=7" means that the initial position of the lookup information is the 7$^{th}$ address in the job sequence permutation unit 33. It should be explained particularly that "lookup index" and "lookup address" are synonymous and can be used alternately in the specification and claims. In one embodiment, the lookup indexes begin from "0".

Once again, 0x0B=11 of the execution demand register 2 is used as the lookup index to look up the registering number unit 32 and find out the 11$^{th}$ element of the registering number unit 32 is "3", which is underlined and expressed by "memory (11)=3". "Lookup value=3" means that there are three newly-registered jobs. In the second stage, the two lookup values are combined to find out that the initial position is the 7$^{th}$ element (is "0") in the job sequence permutation unit 33 and the three elements beginning from the initial position in the job sequence permutation unit 33 are "0", "1", and "3", which are underlined. It means that the job execution sequence is "JOB0→JOB1→JOB3" which is found out from 0x0B of the execution demand register 2 and arranged by the priorities.

TABLE 2 the initial positions, registering number and job sequence permutations of a 4-bit execution demand registering flag

| | Contents |
|---|---|
| Initial position unit | {0, 0, 1, 0, 2, 4, 1, 0, 3, 10, 8, <u>7</u>, 2, 4, 1, 0} |
| Registering number unit | {0, 1, 1, 2, 1, 2, 2, 3, 1, 2, 2, <u>3</u>, 2, 3, 3, 4} |
| Job sequence permutation unit | {0, 1, 2, 3, 0, 2, 3, <u>0, 1, 3</u>, 0, 3} |

In one embodiment, data stored in the lookup device 3 may be organized as follows: firstly, list the execution sequences of all jobs; next, use the values of all the execution demand registers 2 as the indexes to respectively store the initial positions, registering number and job sequence permutations corresponding to the execution demand registers 2 in the initial position unit 31, the registering number unit 32 and the job sequence permutation unit 33.

Table.3 exemplifies a method to establish data stored in the lookup device 3 by a program. "Index" denotes an array stored in the initial position unit 31. "Account" denotes an array stored in the registering number unit 32. "Table" denotes an array stored in the job sequence permutation unit 33. "Test" denotes the execution demand register 2. In the embodiment described in Table.3, the repeated job sequence permutations will not be stored in the job sequence permutation unit 33 repeatedly, whereby the memory burden of this unit can be reduced to achieve optimization. However, the present invention does not limit in this embodiment.

TABLE 3 an exemplification to establish data stored in the lookup device

| Job# | Index | Account | Table | Explanation (the added part is underlined) |
|---|---|---|---|---|
| Test 0000<br>Table = { }<br>Index = {0}<br>Account = {0} | 0 | 0 | { } | The execution demand register 0000 means that none job needs to be executed. The initial position "0" and the registering number "0" are respectively stored in the initial position unit and the registering number unit. In such a case, the job sequence permutation is a null set. |
| Test 0001<br>Table = {0}<br>Index = {0, <u>0</u>}<br>Account = {0, <u>1</u>} | 0 | 1 | JOB0 | The execution demand register 0001 means that JOB0 has to be executed. Table: JOB0 is pushed into Table, and Table is {<u>0</u>}. The initial position of the execution demand register stored in Table is "0", and the registering number is "1". Index: the initial position "0" is pushed into Index, and Index is {0, <u>0</u>}. Account: the registering number "1" is pushed into Account, and Account is {0, <u>1</u>}. |
| Test 0010<br>Table = {0, 1}<br>Index = {0, 0, <u>1</u>}<br>Account = {0, 1, <u>1</u>} | 1 | 1 | JOB1 | The execution demand register 0010 means that JOB1 has to be executed. Table: JOB1 is pushed into Table, and Table is {0, <u>1</u>}. The initial position of the execution demand register stored in Table is "1", and the registering number is "1" Index: the initial position "1" is pushed into Index, and Index is {0, 0, <u>1</u>}. Account: the registering number "1" is pushed into Account, and Account is {0, 1, <u>1</u>}. |
| Test 0011<br>Table = {0, 1}<br>Index = {0, 0, 1, <u>0</u>}<br>Account = {0, 1, 1, <u>2</u>} | 0 | 2 | no data is stored | The execution demand register 0011 means that JOB0→JOB1 has to be executed. Table: as the job execution sequence JOB0→JOB1, i.e. {0, 1}, has been stored in Table, the same data would not be stored in Table repeatedly. The initial position of the execution demand register stored in Table is "0", and the registering number is "2". Index: the initial position "0" is pushed into Index, and Index is {0, 0, 1, <u>0</u>}. Account: the registering number "2" is pushed into Account, and Account is {0, 1, 1, <u>2</u>}. |
| Test 0100<br>Table = {0, 1, 2}<br>Index = {0, 0, 1, 0, <u>2</u>}<br>Account = {0, 1, 1, 2, <u>1</u>} | 2 | 1 | JOB2 | The execution demand register 0100 means that JOB2 has to be executed. Table: JOB2 is pushed into Table, and Table is {0, 1, <u>2</u>}. The initial position of the execution demand register stored in Table is "2", and the registering number is "1". Index: the initial position "2" is pushed into Index, |

TABLE 3-continued an exemplification to establish data stored in the lookup device

| Job# | | Index | Account | Table | Explanation (the added part is underlined) |
|---|---|---|---|---|---|
| | | | | | and Index is {0, 0, 1, 0, <u>2</u>}. Account: the registering number "1" is pushed into Account, and Account is {0, 1, 1, 2, <u>1</u>}. |
| Test 0101 Table = {0, 1, 2, 0, 2} Index = {0, 0, 1, 0, 2, 3} Account = {0, 1, 1, 2, 1, 2} | | 3 | 2 | JOB0 →JOB2 | The execution demand register 0101 means that JOB0→JOB2 has to be executed. Table: the job execution sequence JOB0→JOB2 is pushed into Table, and Table is {0, 1, 2, <u>0, 2</u>}. The initial position of the execution demand register stored in Table is "3", and the registering number is "2". Index: the initial position "3" is pushed into Index, and Index is {0, 0, 1, 0, 2, <u>3</u>}. Account: the registering number "2" is pushed into Account, and Account is {0, 1, 1, 2, 1, <u>2</u>}. |
| The rest may be deduced by analogy | | | | | |

In one embodiment, the contents included in the lookup device 3 are not influenced by the newly-registered jobs but remain constant. The constant contents can be repeatedly used by the iterative scheduling so as to reduce memory burden.

In one embodiment, jobs are divided into a plurality of groups, and the groups share the same table containing the same contents of the same lookup device 3 to realize level scheduling, whereby the system is exempted from using a larger execution demand register, such as an execution demand register with sixteen flags. The same table is used to undertake two-stage lookup for a 4-bit flag in two levels at most five times to examine whether sixteen possibly registered jobs have been newly registered and scheduled into the queue. When a two-stage lookup and scheduling is performed on sixteen jobs in two levels, the sixteen jobs are divided into four groups, and each group contains four jobs respectively having their priorities and the registering flags corresponding to the priorities. The flags are integrated into the execution demand register of the group. The four groups also respectively have their priorities and flags corresponding to the priorities. Each flag expresses whether the group has execution demand. The four flags of the four groups further form an overall register. When a job has execution demand, it registers an in-group flag and undertakes flagging for its own group.

In scheduling, the overall register is used as the address to find out which group has a job registered for execution in two levels. Next, the register of the group having a job registered for execution is used as the address to lookup the same table to determine which jobs in the group needs to be scheduled.

Refer to FIG. 2 again. In conclusion, the present invention provides a scheduling method comprising steps of: providing an execution demand register 2 having a plurality of execution demand registering flags describing whether an identical number of jobs are registered execution demands or not and the priorities thereof (Step 5); providing a lookup device, and using all the possible values of the execution demand registering flags as the addresses to store a job sequence permutation, an initial position and registering number both corresponding to the job sequence permutation (step 6); when at least one job has to be executed, the preceding job or interruption triggers to set the value of the execution demand registering flag corresponding to the succeeding job to proceed register of an execution demand for the succeeding job (Step 7); in scheduling, using the value of the execution demand register 2 updated by registering variation occurring between the preceding scheduling and the current scheduling as the lookup address to find out the initial position and the registering number in the lookup device at the first stage, and the job sequence permutation of newly-registered jobs according to the priorities thereof to complete scheduling.

The scheduling method of the present invention can be used to realize a scheduler. The scheduler can be realized with a software program, such as the C language, to function as a functional block for scheduling of an operating system. Alternatively, the scheduler may be realized with a hardware descriptive language in a CPLD (Complex Programmable Logic Device) chip, a FPGA (Field Programmable Gate Array) chip, or an ASIC (Application-Specific Integrated Circuit) chip. The present invention integrates the job registering flags into a register to replace the polling process that checks all the job flags sequentially. The present invention doses not need a branch checking process and thus can reduce and fix the extra time needed for scheduling. Thereby, the present invention can increase the efficiency of scheduling, decrease the uncertainty of extra execution time in scheduling, and promote the real-time performance of the system. Further, the present invention can be implemented easily. Thus, the present invention can be realized in a large/smaller computer, and CPLD, FPGA or ASIC chip with limited execution time and memory cost.

Instructed by the above description and drawings, the person skilled in the art should be able to make many modifications and variations of the present invention without departing from the spirit of the present invention. The scope of the present invention is not limited by the embodiment described above. Further, any equivalent modification or variation of the present invention is to be also included within the scope of the present invention.

What is claimed is:

1. A method for registering and scheduling execution demands, comprising steps of:
   Step (a): providing an execution demand register including a plurality of execution demand registering flags correspondingly describing whether an identical number of jobs are registered execution demands or not and execution priorities of the jobs;
   Step (b): providing a lookup device, and using all possible values of the execution demand registering flags as addresses to respectively store thereinside a job sequence permutation, initial position and registering number corresponding to the job sequence permutation;
   Step (c): when at least one job has to be executed successively, setting the value of the execution demand registering flag corresponding to the job to complete execution demand registering and update; and
   Step (d): in scheduling, using the value of the updated execution demand register as a lookup address to acquire the initial position and registering number corresponding to the lookup address from the lookup device and find out the job sequence permutation according to the initial position and registering number to complete scheduling.

2. The method for registering and scheduling execution demands according to claim 1, wherein in the Step (b), the lookup device includes at least one memory, and all possible values of the execution demand registering flags are used as addresses to respectively store in the memory the job sequence permutation, the initial position and the registering number corresponding to the job sequence permutation.

3. The method for registering and scheduling execution demands according to claim 1, wherein in the Step (a), the execution demand registering flags includes bits whose number corresponds to a number of the execution demand registering flags, and sequences of the bits are used to describe the priorities of the jobs, and the job including the smallest significant bit has the highest execution priority.

4. The method for registering and scheduling execution demands according to claim 1, wherein in the Step (b), the job sequence permutations are compressed and optimized, and only include the smallest and possibly-appearing job sequence permutation.

5. The method for registering and scheduling execution demands according to claim 1, wherein in the Step (c), when the job is executed successively, a preceding task block sets the execution demand registering flag for a succeeding task block to complete the registering before the preceding task block is ended.

6. The method for registering and scheduling execution demands according to claim 1, wherein after the Step (d), the job sequence permutations are sequentially added into an execution queue to wait for execution.

* * * * *